(12) United States Patent
Aoki

(10) Patent No.: US 9,211,838 B2
(45) Date of Patent: Dec. 15, 2015

(54) WIRE HARNESS ASSEMBLY AND LIGHTING UNIT

(75) Inventor: Yoshihito Aoki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 231 days.

(21) Appl. No.: 13/996,407

(22) PCT Filed: Dec. 20, 2011

(86) PCT No.: PCT/JP2011/079455
§ 371 (c)(1),
(2), (4) Date: Jun. 20, 2013

(87) PCT Pub. No.: WO2012/086624
PCT Pub. Date: Jun. 28, 2012

(65) Prior Publication Data
US 2013/0285549 A1 Oct. 31, 2013

(30) Foreign Application Priority Data
Dec. 21, 2010 (JP) .................. 2010-284477

(51) Int. Cl.
*B60Q 1/14* (2006.01)
*B60Q 3/02* (2006.01)
(Continued)

(52) U.S. Cl.
CPC .......... *B60Q 3/0293* (2013.01); *B60R 16/0207* (2013.01); *H01R 2201/26* (2013.01); *H05B 33/0866* (2013.01); *H05B 33/0872* (2013.01)

(58) Field of Classification Search
CPC ...... B60Q 3/0293; B60Q 1/44; B60Q 1/1415; B60R 16/07

USPC .......................................... 315/77, 78, 79, 80
See application file for complete search history.

(56) References Cited

U.S. PATENT DOCUMENTS 4,122,357 A * 10/1978 Sumida .................. 307/10.1
2004/0230320 A1 11/2004 Nagasawa et al.
(Continued)

FOREIGN PATENT DOCUMENTS

| JP | 4-191952 A | 7/1992 |
| JP | 9-290682 A | 11/1997 |

(Continued)

OTHER PUBLICATIONS

International Search Report for PCT/JP2011/079455 dated Mar. 27, 2012.
(Continued)

*Primary Examiner* — John Poos
(74) *Attorney, Agent, or Firm* — Kenealy Vaidya LLP

(57) ABSTRACT

Provided is a wire harness assembly configured to be lightweight while reducing burden on a first control means, and a lighting unit comprising the wire harness assembly. A wire harness assembly for connecting a plurality of lighting loads to a control unit that outputs a control signal for controlling the plurality of lighting loads independently is provided with: a first wire harness connected to the control unit and including a power-supply line, a ground line, and a signal line for multiplex transmission of the control signal output from the control unit to each of the lighting loads; a second wire harness including a first electric line commonly connected to one ends of the plurality of lighting loads, and a plurality of second electric lines connected to the other ends of the plurality of lighting loads individually; and a relay connector connecting the first wire harness to the second wire harness.

7 Claims, 8 Drawing Sheets

(51) Int. Cl.
  B60R 16/02  (2006.01)
  H05B 33/08  (2006.01)

(56) References Cited

U.S. PATENT DOCUMENTS

2007/0046452 A1  3/2007  Anderson, Jr. et al.
2008/0112175 A1  5/2008  Bucher

FOREIGN PATENT DOCUMENTS

| JP | 2004-268630 A | 9/2004 |
| JP | 2007-276671 A | 10/2007 |
| JP | 2009-1111 A | 1/2009 |
| JP | 2010-215163 A | 9/2010 |

OTHER PUBLICATIONS

Japanese Office Action for the related Japanese Patent Application No. 2010-284477 dated Sep. 2, 2014.

Chinese Office Action for the related Chinese Patent Application No. 201180061995.7 dated Dec. 26, 2014.

* cited by examiner

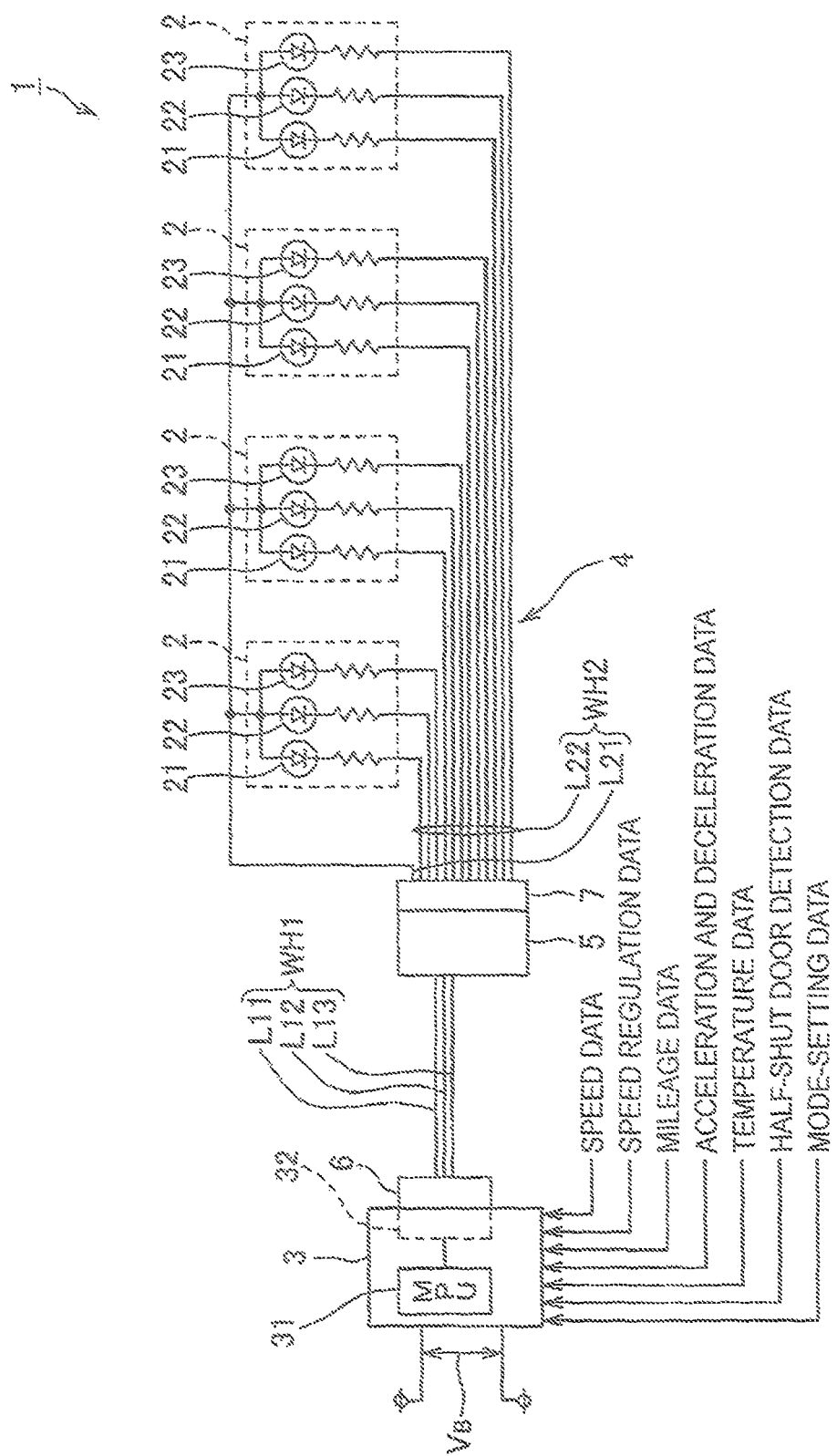

FIG. 3

| LIGHTING MODE | CONTENTS |
|---|---|
| SPEED ASSOCIATED MODE | TO CHANGE LIGHTING COLOR IN ACCORDANCE WITH VEHICLE SPEED DATA |
| ECOLOGICAL DRIVING ASSOCIATED MODE | TO CHANGE LIGHTING COLOR IN ACCORDANCE WITH ECOLOGICAL DRIVING DATA |
| FIRST TEMPERATURE ASSOCIATED MODE | TO CHANGE LIGHTING COLOR TO WARMER COLOR IN ACCORDANCE WITH TEMPERATURE INCREASE |
| SECOND TEMPERATURE ASSOCIATED MODE | TO CHANGE LIGHTING COLOR TO COLDER COLOR IN ACCORDANCE WITH TEMPERATURE INCREASE |
| LIGHT OFF MODE | TO POWER OFF THE LIGHTING LOAD |
| WARNING MODE | TO BLINK RED COLOR THE LIGHTING LOAD CORRESPONDING TO THE DETECTED HALF-SHUT DOOR |

PRIOR ART

WIRE HARNESS ASSEMBLY AND LIGHTING UNIT

This application is a U.S. national phase filing under 35 U.S.C. §371 of PCT Application No. PCT/JP2011/079455, filed Dec. 20, 2011, and which in turn claims priority under 35 U.S.C. §119 to Japanese Patent Application No. JP2010-284477, filed Dec. 21, 2010, the entireties of which are incorporated by reference herein.

TECHNICAL FIELD

The present invention relates to a wire harness assembly and a lighting unit, in particular, to a wire harness assembly for connecting a plurality of lighting loads arranged in various parts of a vehicle with a first control device that outputs a control signal for controlling the plurality of lighting loads independently, and to a lighting unit that includes the wire harness assembly.

BACKGROUND ART

Conventionally, as the above lighting unit, one example is proposed that is shown in FIG. 8. As shown in FIG. 8, a lighting unit 1 includes: a plurality of lighting loads 2 arranged in various parts of a vehicle; a control unit 3 as a first control device for controlling the plurality of lighting loads 2; and a wire harness 8 for connecting the plurality of lighting loads 2 with the control unit 3.

Each of the plurality of lighting loads 2 is composed of a red (R) light source 21, a green (G) light source 22, and a blue light source 23. By adjusting brightness of the R light source 21, the G light source 22, and the B light source 23, the lighting color can be changed. For example, the control unit 3 is composed of a microcomputer and the like.

The wire harness 8 is composed of an electric wire commonly connected to one ends of the plurality of lighting loads 2, and a plurality of electric wires respectively connected to the other ends of the R light sources 21, the G light sources 22, and the B light sources 23 composing the lighting loads 2. In this way, when the other ends of the light sources 21 to 23 are separately connected to the control unit 3, the plurality of lighting loads 2 can be controlled independently.

However, in the lighting unit 1 shown in FIG. 8, the number of the electric wires composing the wire harness 8 is required to (the number of the lighting loads 2× the number of the light sources 21 to 23 composing the lighting load 2). Therefore, there is a problem that the control unit 3 may be upsized, the wire harness 8 may be enlarged, and the weight of the wire harness 8 may be increased due to increase of the number of electric wires. Further, because the control unit 3 directly controls power supply to the lighting loads 2, there is a problem that heavy load is applied to the control unit 3. As shown in FIG. 9, when the number of the lighting loads 2 is increased, these problems are escalated.

Therefore, as shown in FIG. 10, it is considered that the other ends of the R light sources 21, the other ends of the G light sources 22, and the other ends of the B light sources 23 of the lighting loads 2 are commonly connected together. However, in this case, the control unit 3 is prevented from being upsized, and the wire harness 8 is prevented from being enlarged and weighted, but the lighting loads 2 cannot be controlled independently.

SUMMARY OF INVENTION

Technical Problem

Accordingly, an object of the present invention is to provide a wire harness assembly configured to be lightweight while reducing burden on a first control device, and to provide a lighting unit including the wire harness assembly.

Solution to Problem

For achieving the above object, according to a first aspect of the present invention, there is provided a wire harness assembly for connecting a plurality of lighting loads arranged in various parts of a vehicle to a first control device that outputs a control signal for controlling the plurality of lighting loads independently, said wire harness assembly including:

a first wire harness connected to the first control device and including a power-supply line, a ground line, and a signal line for multiplex transmission of the control signal outputted from the first control device to each of the lighting loads;

a second wire harness including a first electric line commonly connected to one ends of the plurality of lighting loads, and a plurality of second electric lines connected to the other ends of the plurality of lighting loads respectively; and a relay connector connecting the first wire harness to the second wire harness, and including a second control device for controlling power supply to each of the lighting loads in accordance with the control signal transmitted from the first control device.

According to a second aspect of the present invention, there is provided the wire harness assembly as described in the first aspect, wherein the each of the lighting loads includes a plurality of light sources emitting colors different front each other, wherein the plurality of second electric lines are respectively connected to the other ends of the light sources, and wherein the second control device controls power supply to each of the light sources so as to emit a lighting color in accordance with the control signal transmitted from the first control device.

According to a third aspect of the present invention, there is provided the wire harness assembly as described in the first or second aspects, further including:

a setting device for setting one of a plurality of lighting modes for each of the lighting loads, wherein the first control device outputs the control signal so that each of the lighting loads emits light in accordance with the lighting mode set by the setting device.

According to a fourth aspect of the present invention, there is provided the wire harness assembly as described in the second aspect, further including:

a setting device for setting one of a plurality of lighting modes for each of the lighting loads, wherein the first control device outputs the control signal so that each of the lighting loads emits light in accordance with the lighting mode set by the setting device, and wherein the plurality of lighting modes includes at least one of: a speed-associated mode for changing the lighting color in accordance with a vehicle speed; an ecological driving-associated mode for changing the lighting color in accordance with ecological driving data; a temperature-assisted mode for changing the lighting color in accordance with vehicle room temperature; and a light off mode for switching off the lighting loads.

According to a fifth aspect of the present invention, there is provided the wire harness assembly as described in the third or fourth aspects, wherein when a half-shut door of a vehicle is detected, the first control device outputs the control signal to notify the hair-shut door by stopping lighting of the lighting load in the lighting mode set for the lighting load corresponding to the detected door, and by blinking the lighting load corresponding to the detected door.

According to a sixth aspect of the present invention, there is provided a lighting unit including:

a plurality of lighting loads arranged in various parts of a vehicle;

a first control device that outputs a control signal for controlling the plurality of lighting loads independently; and the wire harness assembly as described in the first aspect for connecting the plurality of lighting loads to the first control device.

Advantageous Effects of Invention

As described above, according to the inventions described in the first and sixth aspects, the second control device included in the relay connector controls the power supply to each of the light sources in accordance with the control signal emitted from the first control device. Therefore, the burden on the first control device can be reduced. Further, because the first wire harness between the first control device and the relay connector is composed of only three electric lines of the power supply line, the ground line, and the signal line, the wire harness assembly can be lightweight.

According to the invention described in the second aspect, it is possible to provide information to a vehicle crew using the lighting color without increasing its weigh. Therefore, merchantability of the wire harness assembly can be increased.

According to the invention described in the third aspect, it is possible to set the lighting mode to each of the lighting loads. Therefore, merchantability of the wire harness assembly can be increased.

According to the invention described in the fourth aspect, it is possible to set the lighting mode to each of the lighting loads. Further, the vehicle speed data, the ecological driving data, and the temperature data can be transferred to the vehicle crew using the lighting. Therefore, merchantability of the wire harness assembly can be increased.

According to the invention described in the fifth aspect, the half-shut door detection is notified preferentially.

BRIEF DESCRIPTION OF DRAWINGS

FIG. 1 is an explanatory view showing an embodiment of a lighting unit having a wire harness assembly according to the present invention.

FIG. 3 is a table showing lighting modes performed by MPU in a control unit of FIG. 1.

DESCRIPTION OF EMBODIMENTS

Figure 2A:
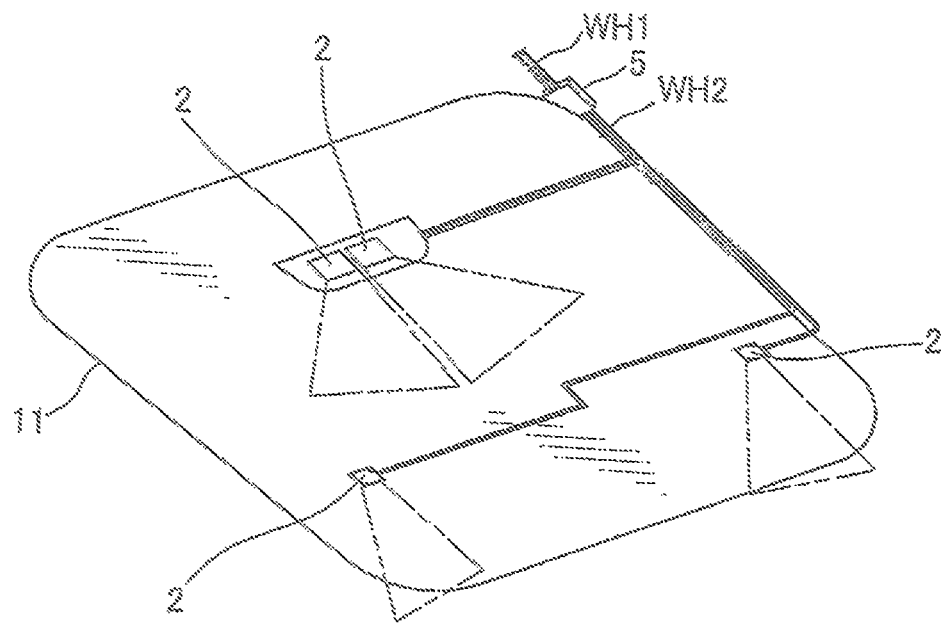
FIG. 2A is an explanatory view showing lighting loads of FIG. 1 arranged on a roof portion of a vehicle.
Figure 4A:
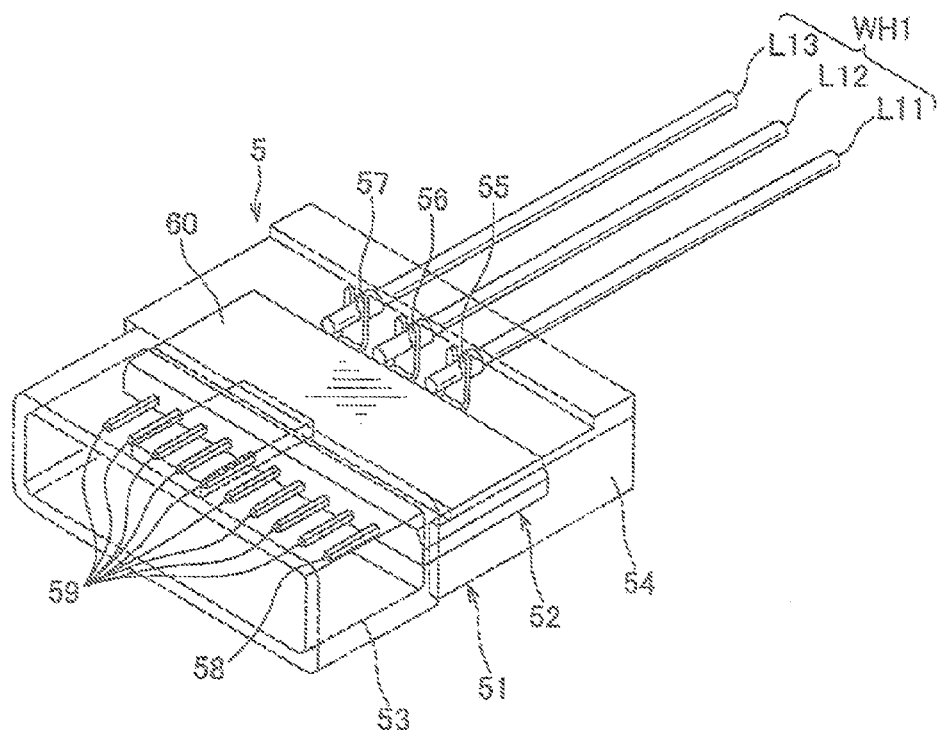
FIG. 4A is a perspective view showing a relay connector of FIG. 1.
Figure 4B:
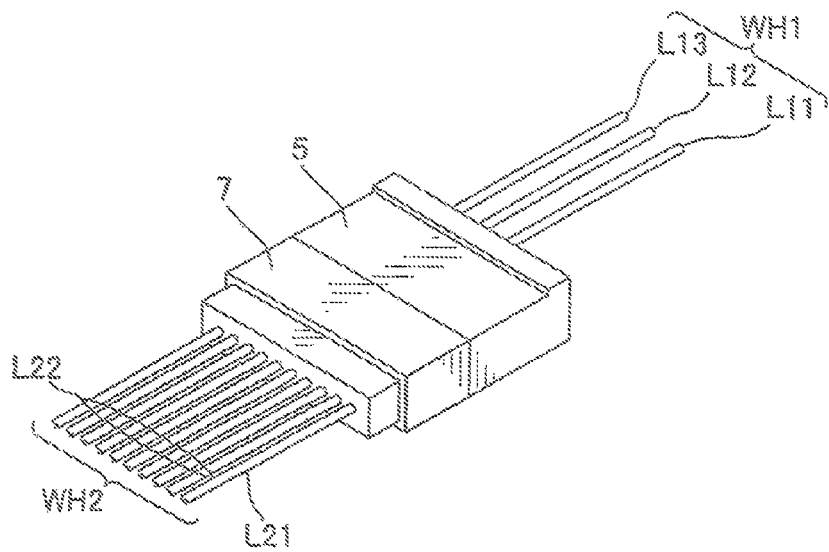
FIG. 4B is a perspective view showing the relay connector and a connecting connector of FIG. 1 connected together.
Figure 5:
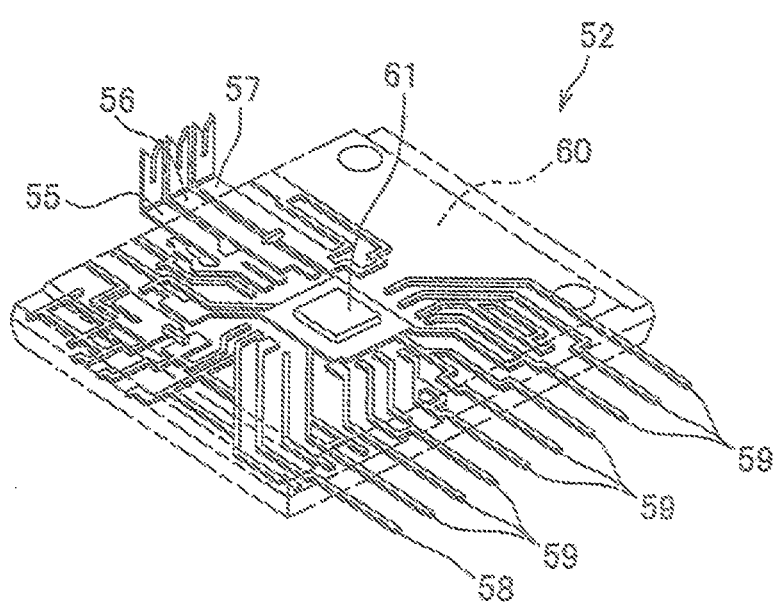
FIG. 5 is a perspective view showing a control circuit package included in the relay connector of FIG. 4.

Hereinafter, a lighting unit and a wire harness assembly according to the present invention will be explained with reference to FIGS. 1 to 5. FIG. 1 is an explanatory view showing an embodiment of a lighting unit having a wire harness assembly according to the present invention. FIG. 2A is an explanatory view showing lighting loads of FIG. 1 arranged on a roof portion of a vehicle. FIG. 3 is a table showing lighting modes performed by MPU in a control unit of FIG. 1. FIG. 4A is a perspective view showing a relay connector of FIG. 1. FIG. 4B is a perspective view showing the relay connector and a connecting connector of FIG. 1 connected together. FIG. 5 is a perspective view showing an IC chip included in the relay connector of FIG. 4.

A lighting unit 1 shown in FIG. 1 includes: a plurality of lighting loads 2 arranged in various parts of a vehicle; a control unit 3 as the first control device that outputs a control signal for controlling the plurality of lighting loads 2 independently; and a wire harness assembly 4 connecting the plurality of lighting loads 2 with the control unit 3.

Figure 2B:
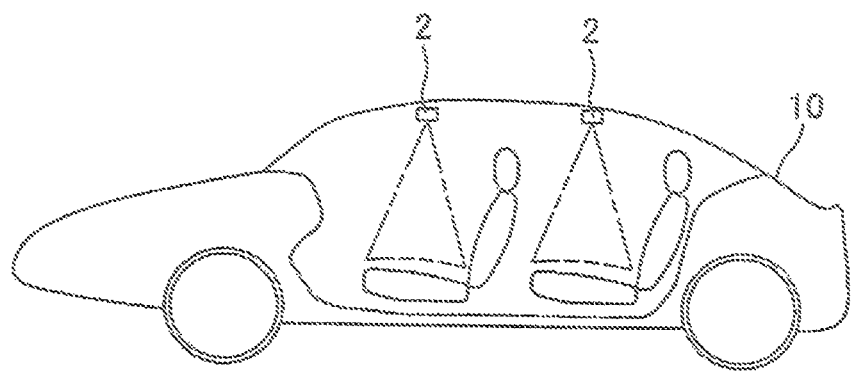
FIG. 2B is an explanatory view showing lighting loads of FIG. 1 arranged on a roof portion of a vehicle.

Each of the lighting loads 2 is composed of a red (R) light source 21, a green (G) light source 22, and a blue (B) light source 23. By independently adjusting the brightness of the R, G, B light sources, the lighting color can be changed. As shown in FIGS. 2A and 2B, these lighting loads 2 are arranged in a roof portion 11 of a vehicle 10, and illuminate a driver seat, a front passenger seat, a rear left seat, and a rear right seat.

As shown in FIG. 3, any one of speed-associated mode, ecological driving-associated mode, first temperature-associated mode, second temperature-associated mode, and light off mode as lighting mode is set on each of the lighting loads 2. Further, as shown in FIG. 3, warning mode is set on these lighting loads 2.

The speed-associated mode is a mode that corresponding to vehicle speed data, the lighting color of the lighting loads 2 is changed. In this speed-associated mode, for example, when the vehicle speed data is equal to regulatory speed data of a road on which the vehicle is running received from a navigation device, the lighting loads 2 emit an intermediate color between red and green. Further, as the vehicle speed data is larger than the regulatory speed data, the red color is brighter, and as the vehicle speed data is smaller than the regulatory speed data, the green color is brighter. Here, comparing the vehicle speed data with the regulatory speed data, the lighting loads 2 emit light. However, simply, comparing the vehicle speed data with specific speed, the lighting loads 2 may emit light.

The ecological driving-associated mode is a mode that the lighting color of the lighting loads 2 is changed in accordance with ecological driving data such as mileage data or acceleration/deceleration data. The first temperature-associated mode is a mode that as the vehicle room temperature is lower, the lighting loads 2 emit colder color, and as the vehicle room temperature is higher, the lighting loads 2 emit warmer color. The second temperature-associated mode is a mode that in contrast to the first temperature-associated mode, as the vehicle room temperature is lower, the lighting loads 2 emit warmer color, and as the vehicle room temperature is higher, the lighting loads 2 emit colder color. The light off mode is a mode that the lighting loads 2 are turned off.

The warning mode is a mode that when the half-shut door is detected, the lighting of the lighting load 2 corresponding to the detected door with the lighting mode set to the lighting load is stopped, and the half-shut door is notified by blinking red light of the lighting load 2 corresponding to the detected door. Concretely, when the front passenger door is half-shut, the lighting load 2 that illuminates the front passenger seat is blinked in red.

As a setting method for setting the above lighting mode, for example, a touch panel operation of a navigation device mounted on an instrument panel of a vehicle may be used, or a switch operation provided around each lighting load 2 may be used.

As shown in FIG. 1, a power-supply voltage $V_B$ from a battery is supplied to the control unit 3. The control unit 3 includes: a microprocessor (MPU) 31 for controlling the whole lighting unit 1; and an outer connector for connecting to a later-described wire harness assembly 4.

The vehicle speed data from a not-shown vehicle speed sensor, the regulatory speed data from a not-shown navigation device, the mileage data from a not-shown mileage sensor, the acceleration and deceleration data from a not-shown acceleration sensor, the temperature data from a not-shown temperature sensor, the half-shut door detection data from a not-shown half-shut door detection sensor, and the mode-setting data for indicating the lighting mode set on each lighting loads 2 are inputted to the MPU 31. The MUP 31 outputs the control signal in accordance with the lighting mode set on each lighting load 2. Namely, the MPU 31 identifies the lighting mode set on each lighting load 2 from the mode setting data, and outputs the control signal for each lighting mode with identification data of each lighting load 2 on which the lighting mode is set.

The outer connector 32 includes: a power supply terminal (not shown) from which the positive voltage of the power-supply voltage $V_B$ is outputted; a ground terminal (not shown) from which the negative voltage of the power-source voltage $V_B$ is outputted; and a signal terminal (not shown).

As shown in FIG. 1, the wire harness assembly 4 includes: a first wire harness WH1; a second wire harness WH2; and a relay connector 5 connecting the first wire harness WH1 with the second wire harness WH2. The first wire harness WH1 includes: a power supply line L11 to be connected to the power supply terminal of the outer connector 32; a ground line L12 to be connected to the ground terminal; and a signal line L13 to be connected to the signal terminal for multiplex transmission of the control signed.

A connecting connector 6 is provided on one end of the first wire harness WH1. When this connecting connector 6 is connected to the outer connector 32, the power supply terminal of the outer connector 32 is connected to the power supply line L11, the ground terminal is connected to the ground line L12, and the signal line is connected to the signal line L13. Further, a later-described relay connector 5 is attached to the other end of the first wire harness WH1.

The second wire harness WH2 includes: a first electric line L21 commonly connected to one ends of the plurality of lighting loads 2; a plurality of second electric lines L22 connected to the other ends of the plurality of lighting loads 2 individually. A connecting connector 7 to be connected to the relay connector 5 is attached to one end of the second wire harness WH2.

For example, as shown in FIG. 2A, the relay connector 5 is arranged around the roof portion 11. As shown in FIG. 4A, the relay connector 5 includes: an outer housing 51; and a control circuit package 52 received in the outer housing 51. As shown in FIG. 4A, the outer housing 51 is made of insulating synthetic resin, formed in a flat box shape, and integrally includes: a rectangular-tube-shaped hood portion 53; and a control circuit package receiving chamber 54 continued to the hood portion 53.

As shown in FIGS. 4A and 5, the control circuit package 52 includes: a power supply terminal 55 to be connected to the power supply line L11; a ground terminal 56 to be connected to the ground line L12; a signal terminal 57 to be connected to the signal line L13; a first terminal 58 to be connected to the first electric line L21; a plurality of second terminals 59 to be respectively connected to the plurality of second electric lines L22; and a sealing body 60.

The power supply terminal 55, the ground terminal 56, and the signal terminal 57 are made of conductive metal. One ends of the terminals 55 to 57 are inserted into the sealing body 60, and the other ends are respectively projected from one of a pair of facing surfaces of the sealing body 60. Further, press-connecting terminals are formed on the other ends of the terminals 55 to 57 projected outward. The power supply line L11, the ground line L12, and the signal line L13 are press-connected to the press-connecting terminals.

The first and the second terminals 58, 59 are made of conductive metal, and one ends of the terminals 58, 59 are inserted into the sealing body 60, and the other ends are respectively projected from one of a pair effacing surfaces of the seating body 60. Further, male tab terminals are formed on the other ends of the terminals 58, 59 respectively projected outward, and received in the hood portion 53 of the outer housing 51.

When the connecting connector 7 attached to the end of the second wire harness WH2 is connected to the relay connector 5, the male tab terminals formed on the first and second terminals 58, 59 are electrically connected to female terminals (not shown) in the connecting connector 7. Thereby, the first terminal 58 is connected to the first electric line L21, and the second terminals 59 are connected to the second electric lines L22.

As shown in FIG. 5, the sealing body 60 is plastic molding a chip 61 as a second control device in which a not-shown microcomputer is included, and the one ends of the terminals 55 to 59, while the chip 61 is connected to the one ends of the terminals 55 to 59 by wire bonding. The chip 61 supplies the power supply voltage $V_B$ supplied via the power supply line L11 and the ground line L12 to both ends of each of light sources 21 to 23 as a pulsed voltage. At this time, in accordance with the control signal inputted from the control unit 3 via the signal line L13, the chip 61 controls the duty of the pulsed power supply voltage $V_B$ to adjust the brightness of each light source 21 to 23 independently and to change the lighting color of the lighting loads 2.

Figure 6:
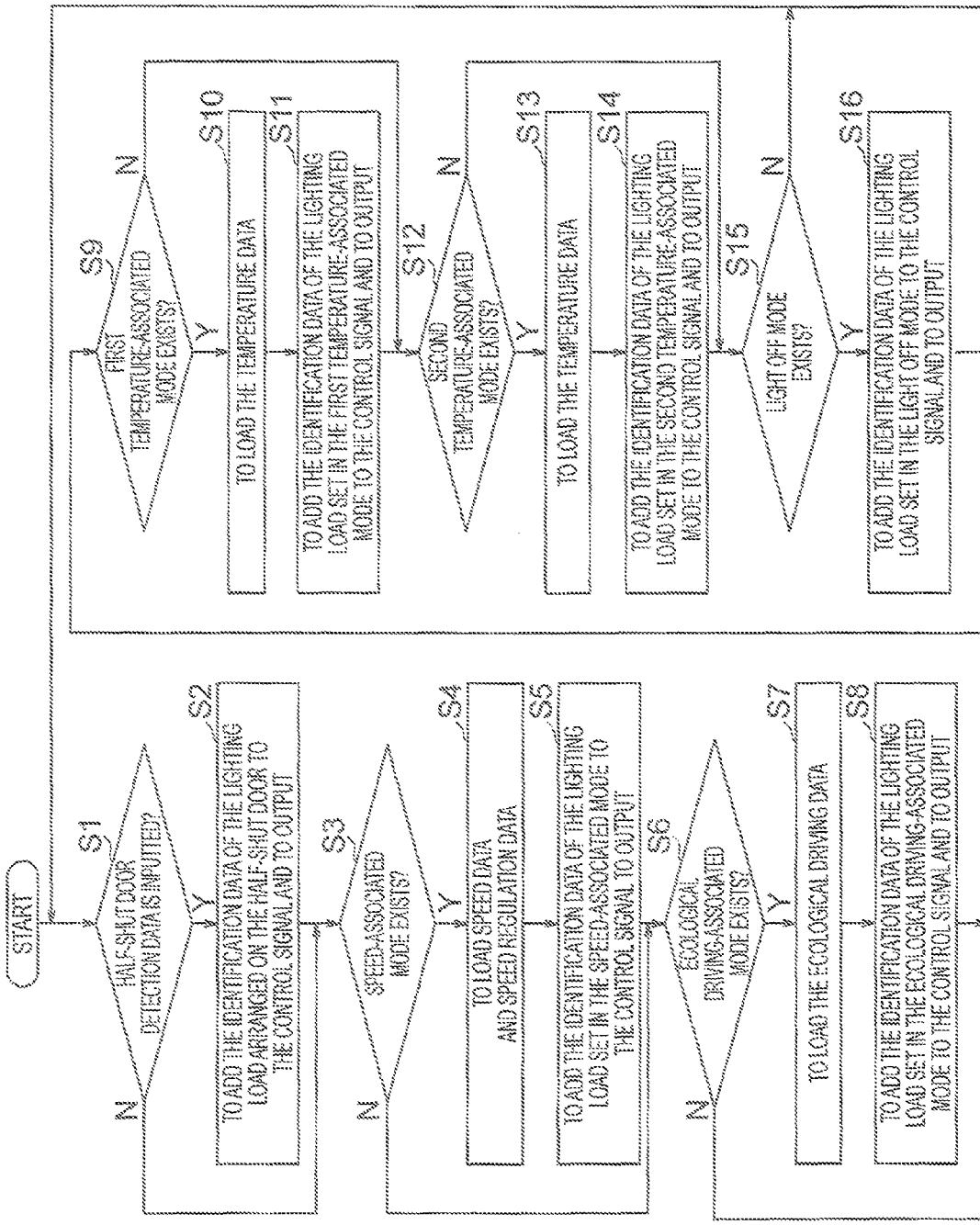
FIG. 6 is a flowchart showing a procedure of the control unit shown in FIG. 1.

Next, an operation of the lighting unit 1 will be explained with reference to FIG. 6. FIG. 6 is a flowchart showing a procedure of the control unit 3 shown in FIG. 1. First, the MPU 31 starts a process corresponding to, for example, turning on of an ignition of a vehicle, or a release signal of a door lock. First, the MPU 31 judges whether the half-shut door detection data is inputted or not (step S1).

When it is judged that the half-shut door detection data is inputted ("Y" in step S1), the MPU 31 adds the identification data of the lighting load 2 arranged on the half-shut door to the control signal of blinking red light and outputs (step S2), then goes to step S3. In contrast, when it is judged that the half-shut door detection data is not inputted ("N" in step S1), the MPU 31 directly goes to step S3 without processing step S2.

In step S3, the MPU 31 judges whether the lighting load 2 set in the speed-associated mode exists or not based on the mode-setting data. When it is judged that the lighting load 2 set in the speed-associated mode exists ("Y" in step S3), the MPU 31 loads the speed data and the speed regulation data (step S4), adds the identification data of the lighting load 2 set in the speed-associated mode to the control signal showing the lighting color corresponding to the loaded speed data and the loaded speed regulation data, and outputs (step S5), and then goes to step S6. In contrast, when it is judged that the lighting load 2 set in the speed-associated mode does not exist ("N" in step S3), the MPU 31 directly does to step S6 without processing steps S4 and S5.

Next, in step S6, the MPU 31 judges whether the lighting load 2 set in the ecological driving-associated mode exists or not based on the mode-setting data. When it is judged that the lighting load 2 set in the ecological driving-associated mode exists ("Y" in step S6), the MPU 31 loads the ecological driving data such as the mileage data and the acceleration and deceleration data (step S7), adds the identification data of the lighting load 2 set in the ecological driving-associated mode to the control signal showing the lighting color corresponding to the loaded ecological driving data, and outputs (step S8), and then goes to step S9. In contrast, when it is judged that the lighting load 2 set in the ecological driving-associated mode does not exist ("N" in step S6), the MPU 31 directly does to step S9 without processing steps S7 and S8.

Next, in step S9, the MPU 31 judges whether the lighting load 2 set in the first temperature-associated mode exists or not based on the mode-setting data. When it is judged that the lighting load 2 set in the first temperature-associated mode exists ("Y" in step S9), the MPU 31 loads the temperature data (step S10), adds the identification data of the lighting load 2 set in the first temperature-associated mode to the control signal showing the lighting color corresponding to the loaded temperature data, and outputs (step S11), and then goes to step S12. In contrast, when it is judged that the lighting load 2 set in the first temperature-associated mode does not exist ("N" in step S9), the MPU 31 directly does to step S12 without processing steps S10 and S11.

Next, in step S12, the MPU 31 judges whether the lighting load 2 set in the second temperature-associated mode exists or not based on the mode-setting data. When it is judged that the lighting load 2 set in the second temperature-associated mode exists ("Y" in step S12), the MPU 31 loads the temperature data (step S13), adds the identification data of the lighting load 2 set in the second temperature-associated mode to the control signal showing the lighting color corresponding to the loaded temperature data, and outputs (step S12), and then goes to step S15. In contrast, when it is judged that the lighting load 2 set in the second temperature-associated mode does not exist ("N" in step S12), the MPU 31 directly does to step S15 without processing steps S13 and S14.

Next, in step S15, the MPU 31 judges whether the lighting load 2 set in the light off mode exists or not based on the mode-setting data. When it is judged that the lighting load 2 set in the light off mode exists ("Y" in step S15), the MPU 31 adds the identification data of the lighting load 2 set in the light off mode to the control signal for turning off the light, and outputs (step S16), and then goes back to step S1. In contrast, when it is judged that the lighting load 2 set in the light off mode does not exist ("N" in step S15), the MPU 31 directly does to step S1 without processing step S16.

Incidentally, in steps S5, S8, S11, S14, and S16, the MPU 31 removes the identification data of the lighting load 2 corresponding to the half-shut door detected in step S1 from the identification data of the lighting load 2 for adding to the control signal. Thereby, when the half-shut door of a vehicle is detected, the lighting in the lighting mode previously set for the lighting load 2 corresponding to the detected half-shut door is stopped, and the lighting of the lighting load 2 corresponding to the detected half-shut door is blinking to assign priority to the notification of the half-shut door.

The chip 61 in the relay connector 5 controls each of the lighting loads 2 in accordance with the control signal received from the control unit 3. Namely, the chip 61 outputs the pulsed power-supply voltage $V_B$ having a duty of the lighting color shown in the identification data to each of the light sources 21 to 23 of the lighting loads 2 corresponding to the identification data added to the control signal.

According to the above lighting unit 1, the wire harness assembly 4 for connecting the plurality of lighting loads 2 with the control unit 3 that outputs the control signal for controlling the plurality of lighting loads 2 independently is provided with the first wire harness WH1 connected to the control unit 3 and including the power-supply line L11, the ground line L12, and the signal line L13 for multiplex transmission of the control signal output from the control unit 3 for each of the lighting loads 2; the second wire harness WH2 including the first electric line L21 commonly connected to one ends of the plurality of lighting loads 2, and the plurality of second electric lines L22 connected to the other ends of the plurality of lighting loads 2 individually; and the relay connector 5 connecting the first wire harness WH1 with the second wire harness WH2. The relay connector 5 includes the built-in chip 61 for controlling power supply to each of the lighting loads 2 in accordance with the control signal transmitted from the control unit 3. Therefore, because the built-in chip 61 controls power supply to each of the lighting loads 2 in accordance with the control signal transmitted from the control unit 3, the burden on the control unit 3 can be reduced. Further, because the first wire harness WH1 between the control unit 3 and the relay connector 5 is composed of only three lines of the power supply line L11, the ground line L12, and the signal line L13, the wire harness assembly 4 can be lightweight.

Further, according to the above lighting unit 1, the each of the lighting loads 2 is composed of a plurality of light sources 21 to 23 emitting colors different from each other. The plurality of second electric lines L2 are respectively connected to the other ends of the light sources 21 to 23. The chip 61 in the relay connector 5 controls power supply to each of the light sources 21 to 23 so as to emit a lighting color in accordance with the control signal emitted from the control unit 3. Therefore, it is possible to provide information to a vehicle crew using the lighting color without increasing its weigh, and merchantability of the wire harness assembly 4 can be increased.

Further, according to the above lighting unit 1, the control unit 3 outputs the control signal so that each of the lighting loads 2 emits light in accordance with the lighting mode set by a not-shown setting device. Because it is possible to set the lighting mode to each of the lighting loads 2, merchantability of the wire harness assembly 4 can be increased. Further, the plurality of lighting modes includes at least one of: a speed-associated mode for changing the lighting color in accordance with a vehicle speed; an ecological driving-associated mode for changing the lighting color in accordance with ecological driving data; a temperature-associated mode for changing the lighting color in accordance with vehicle room temperature; and a light off mode for switching off the lighting loads. The vehicle speed data, the ecological driving data, and the temperature data can be transferred to the vehicle crew using the lighting. Therefore, merchantability of the wire harness assembly 4 can be increased.

Further, according to the above lighting unit 1, when a half-shut door of a vehicle is detected, the control unit 3 outputs the control signal so as to stop lighting of the lighting load 2 corresponding to the detected door with the lighting mode set to the lighting load 2, and to notify the half-shut door by blinking light of the lighting load 2 corresponding to the detected door. Thereby, the half-shut door detection is notified preferentially.

Figure 7:
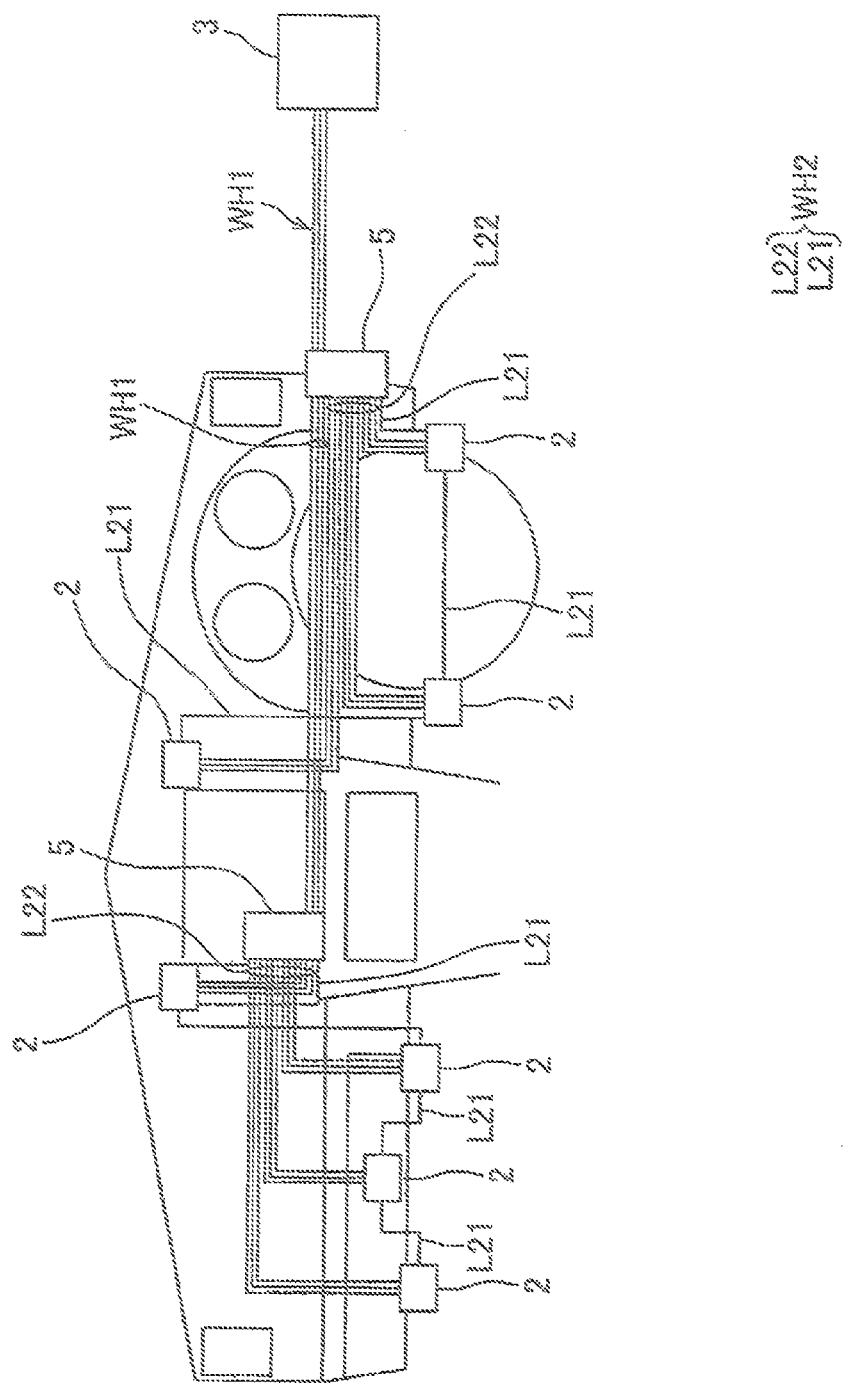
FIG. 7 is an explanatory view showing the lighting loads of FIG. 1 arranged on an instrument panel of a vehicle.
Figure 8:
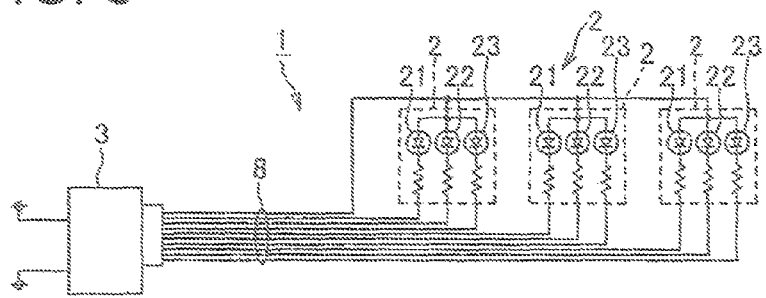
FIG. 8 is a circuit diagram showing an embodiment of a conventional lighting unit.
Figure 9:
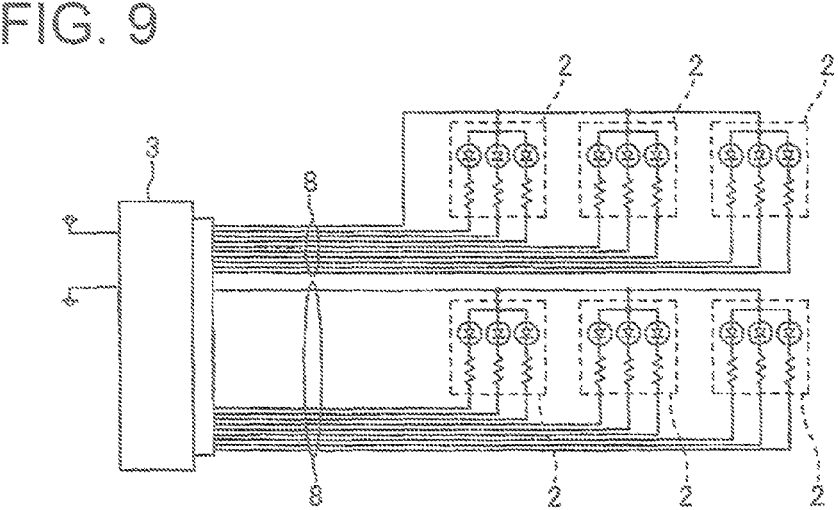
FIG. 9 is a circuit diagram showing an embodiment of a conventional lighting unit.
Figure 10:
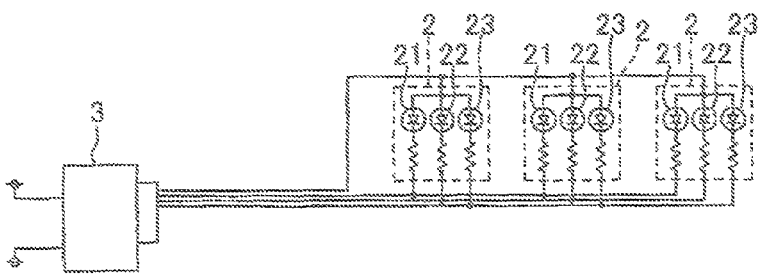
FIG. 10 is a circuit diagram showing an embodiment of a conventional lighting unit.

Incidentally, according to the above embodiment, as shown in FIGS. 2A and 2B, the lighting loads 2 are arranged on the roof portion 11. However, the present invention is not limited to this. The lighting loads 2 can be arranged in anywhere as long as inside a vehicle. For example, as shown in FIG. 7, the lighting loads 2 may be arranged on an instrument panel.

Further, according to the above embodiment, the single relay connector 5 is provided on the single control unit 3. However, the present invention is not limited to this. For example, as shown in FIG. 7, a plurality of relay connectors 5 (two in FIG. 7) can be provided on the single control unit 3. As shown in FIG. 7, one of the two relay connectors 5 is provided on the end of the first wire harness WH1 extended out of the control unit 3. The other of the two relay connectors 5 is provided on the end of the first wire harness WH1 via the one relay connector 5 extended out of the control unit 3.

Further, according to the above embodiment, the lighting loads 2 are composed of the plurality of light sources emitting colors different from each other. However, the present invention is not limited to this. The lighting load 2 may be composed of a single light source emitting mono color.

Incidentally, the above embodiment only shows a representative example of the present invention. The present invention is not limited to the embodiment. Namely, various modifications can be practiced within a scope of the present invention.

REFERENCE SIGNS LIST 1 lighting unit
2 lighting load
3 control unit (first control device)
4 wire harness assembly
5 relay connector
10 vehicle
21 R light source (light source)
22 G light source (light source)
23 B light source (light source)
61 chip (second control device)
L11 power supply line
L12 ground line
L13 signal hue
L21 first electric line
L22 second electric lines
WH1 first wire harness
WH2 second wire harness

The invention claimed is:

1. A wire harness assembly for connecting a plurality of lighting loads arranged in various parts of a vehicle to a first control device that outputs a control signal for controlling the plurality of lighting loads independently, said wire harness assembly comprising:
a first wire harness connected to the first control device and including a power-supply line, a ground line, and a signal line for multiplex transmission of the control signal outputted from the first control device to each of the lighting loads;
a second wire harness including a first electric line commonly connected to one ends of the plurality of lighting loads, and a plurality of second electric lines connected to the other ends of the plurality of lighting loads respectively; and
a relay connector connecting the first wire harness to the second wire harness, and including a second control device for controlling power supply to each of the lighting loads in accordance with the control signal transmitted from the first control device.

2. The wire harness assembly as claimed in claim 1, wherein the each of the lighting loads includes a plurality of light sources emitting colors different from each other,
wherein the plurality of second electric lines are respectively connected to the other ends of the light sources, and
wherein the second control device controls power supply to each of the light sources so as to emit a lighting color in accordance with the control signal transmitted from the first control device.

3. The wire harness assembly as claimed in claim 1, further comprising: a setting device for setting one of a plurality of lighting modes for each of the lighting loads, wherein the first control device outputs the control signal so that each of the lighting loads emits light in accordance with the lighting mode set by the setting device.

4. The wire harness assembly as claimed in claim 2, further comprising: a setting device for setting one of a plurality of lighting modes for each of the lighting loads, wherein the first control device outputs the control signal so that each of the lighting loads emits light in accordance with the lighting mode set by the setting device, and wherein the plurality of lighting modes includes at least one of: a speed-associated mode for changing the lighting color in accordance with a vehicle speed; an ecological driving-associated mode for changing the lighting color in accordance with ecological driving data; a temperature-associated mode for changing the lighting color in accordance with vehicle room temperature; and a light off mode for switching off the lighting loads.

5. The wire harness assembly as claimed in claim 3, wherein when a half-shut door of a vehicle is detected, the first control device outputs the control signal to notify the half-shut door by stopping lighting of the lighting load in the lighting mode set for the lighting load corresponding to the detected door, and by blinking the lighting load corresponding to the detected door.

6. A lighting unit comprising: a plurality of lighting loads arranged in various parts of a vehicle; a first control device that outputs a control signal for controlling the plurality of lighting loads independently; and the wire harness assembly as claimed in claim 1 for connecting the plurality of lighting loads to the first control device.

7. The wire harness assembly as claimed in claim 1, wherein the relay connector includes an outer housing, a plurality of terminal fittings accommodated in the outer housing, the terminal fittings being respectively connected to the power-supply line, the ground line, the signal line, the first electric line and the plurality of second electrical lines, and the second control device accommodated in the outer housing.

* * * * *